(12) United States Patent
Bousset

(10) Patent No.: US 9,446,741 B2
(45) Date of Patent: *Sep. 20, 2016

(54) WIPER BLADE COMPRISING A SUPPORT MOUNT, AN INTERNAL VERTEBRA AND A CONNECTING ELEMENT

(71) Applicant: Valeo Systèmes d'Essuyage, Le Mesnil Saint Denis (FR)

(72) Inventor: Xavier Bousset, Mezel (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 280 days.

This patent is subject to a terminal disclaimer.

(21) Appl. No.: 14/099,025

(22) Filed: Dec. 6, 2013

(65) Prior Publication Data

US 2014/0096337 A1    Apr. 10, 2014

Related U.S. Application Data

(63) Continuation of application No. 12/097,009, filed as application No. PCT/EP2006/069560 on Dec. 11, 2006, now Pat. No. 8,782,845.

(30) Foreign Application Priority Data

Dec. 14, 2005   (FR) ..................................... 05 12637

(51) Int. Cl.
*B60S 1/40*    (2006.01)
*B60S 1/32*    (2006.01)
*B60S 1/38*    (2006.01)

(52) U.S. Cl.
CPC .................. *B60S 1/32* (2013.01); *B60S 1/386* (2013.01); *B60S 1/3881* (2013.01); *B60S 1/40* (2013.01); *B60S 1/387* (2013.01); *B60S 1/3858* (2013.01)

(58) Field of Classification Search
CPC .. B60S 1/3858; B60S 1/3849; B60S 1/3863; B60S 1/386; B60S 1/387
USPC ............................. 15/250.31, 250.32, 250.43
See application file for complete search history.

(56) References Cited

U.S. PATENT DOCUMENTS

| 6,161,248 A * | 12/2000 | Merkel ..................... B60S 1/38 |
| | | 15/250.32 |
| 2009/0056049 A1* | 3/2009 | Jarasson ................. B60S 1/381 |
| | | 15/250.32 |

FOREIGN PATENT DOCUMENTS

| DE | 196 41 042 A1 | 4/1998 |
| DE | 20 2005 012 619 U1 | 10/2005 |
| FR | 2 854 852 A | 11/2004 |
| FR | 2 868 376 A | 10/2005 |

OTHER PUBLICATIONS

International Search Report issued in corresponding International Application No. PCT/EP2006/069560 dated Feb. 6, 2007 and English translation thereof (6 pages).

* cited by examiner

*Primary Examiner* — Michael Jennings
(74) *Attorney, Agent, or Firm* — Osha Liang LLP

(57) ABSTRACT

A motor vehicle wiper blade includes a support mount extending in a longitudinal main direction, and including a support for a wiping blade and a tubular body having a longitudinal main axis, a structural element in the form of a longitudinal horizontal strip which is accommodated inside the tubular body, and an element for connecting the blade to a drive arm which is mounted on the support mount and which includes a locking mechanism for locking the structural element in a position in the connecting element. The locking mechanism of the connecting element includes, on the one hand, a longitudinal mechanism for locking the structural element in said position, and on the other hand, an angular mechanism for locking the structural element in said position.

17 Claims, 3 Drawing Sheets

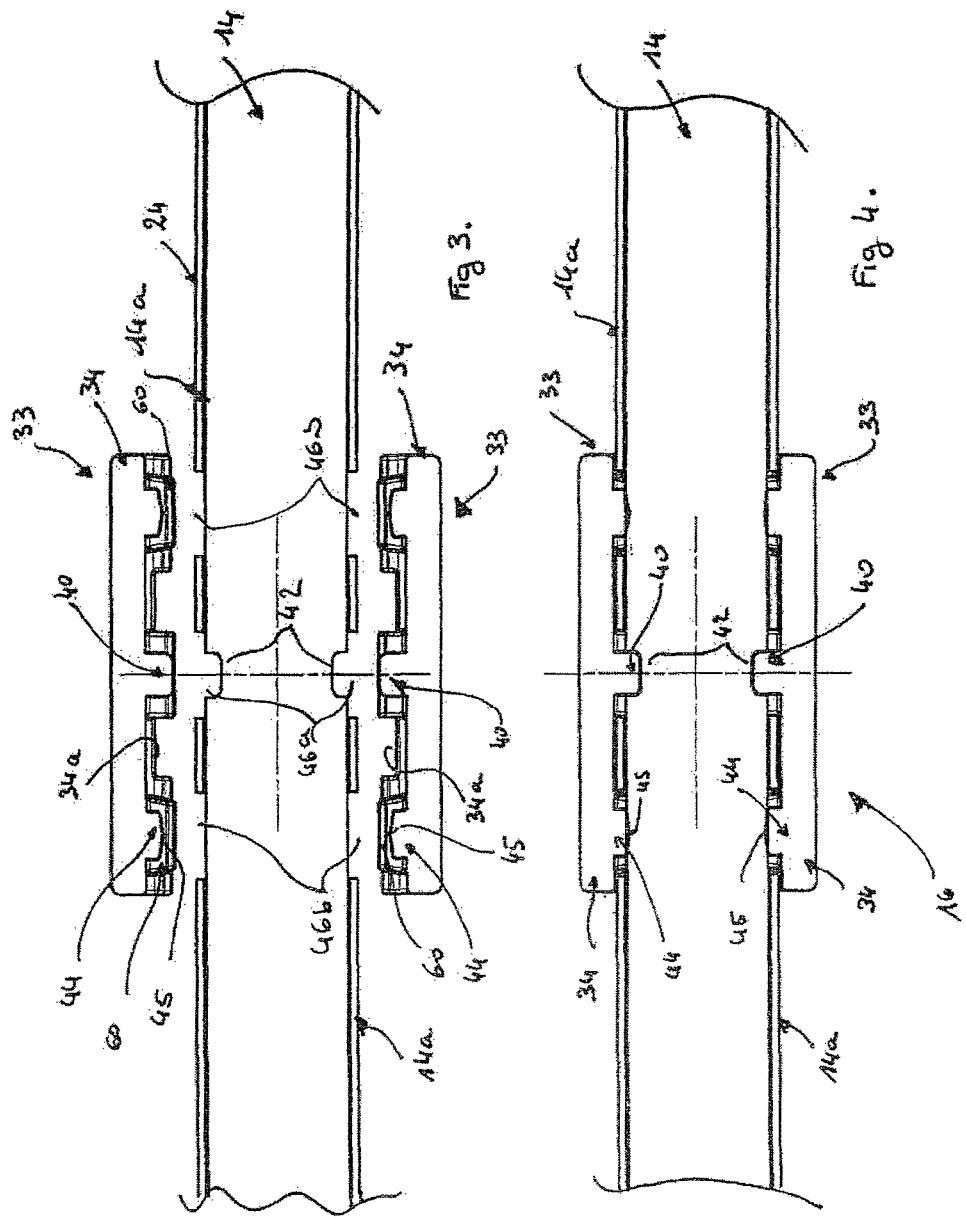

WIPER BLADE COMPRISING A SUPPORT MOUNT, AN INTERNAL VERTEBRA AND A CONNECTING ELEMENT

This application is a continuation application of U.S. patent application Ser. No. 12/097,009 filed Jun. 11, 2008, which is a national stage application of PCT/EP2006/069560 filed Dec. 11, 2006, which claims priority to FR 0512637 filed Dec. 14, 2005.

The invention provides a motor vehicle wiper blade of the "flat blade" type comprising a connecting element for the connection to a drive arm which provides the fastening of a structural element to a support mount.

The invention more particularly provides a motor vehicle wiper blade comprising:

a support mount having a longitudinal main direction, which comprises means for supporting a wiping blade and a tubular body having a longitudinal main axis;

a structural element in the form of a longitudinal horizontal strip which is accommodated inside a tubular body; and an element for connecting the blade to a drive arm which is mounted on the support mount and which comprises locking means for locking the structural element in position in the connecting element.

According to a concept which consists in providing low wiper blades, the articulated structure of the wiper blade which carries the wiping blade or wiping rubber blade is omitted, and the association of a hollow support mount with a stiffening longitudinal vertebra constitutes the structure of the wiper blade proper.

The support mount has the shape of a segment of a longitudinal section which includes a tubular body inside which the vertebra, which is in the form of a longitudinal horizontal blade, is accommodated.

The mount finally includes lower mounting hooks for the wiping blade.

The vertebra is made in a rigid material for example steel, making it possible to press the wiping blade against the glass surface to be wiped.

The wiper blade also includes an element for connecting the blade to a drive arm during the wiping, which is mounted around a body of the support mount and which includes locking means for locking the vertebra during a longitudinal motion in a position mounted inside of the body of the support mount.

Document U.S. Pat. No. 6,161,248 discloses a wiper blade of the "flat blade" type for which the connecting element is connected to the vertebra by means of elastic tabs which are accommodated in grooves matching the vertebra.

Document FR-A-2 868 376 discloses a wiper blade of the "flat blade" type, wherein the connecting element is connected to the support mount by locking means composed of teeth which are accommodated in notches provided in the side edges of the vertebra.

During various tests carried out on the later fastening device, clearances appeared between the connecting elements and the vertebra. Such disadvantage is more particularly resulting from the position of teeth with respect to the notches in the vertebra, since the second pair of teeth may not exactly be opposite the associated notches because of the tolerances on the various parts or on the assembling means and if the positioning reference is provided by a first pair of teeth.

Besides, and compulsorily from an industrial point of view, the cuts in the vertebra cause square corners to appear on the edges, and the contact of a tooth at the level of a square corner creates a localized contact area which does not extend on the whole of the tooth geometry and the corresponding notch thereof.

Thus, when and as the wiper blade is used, the teeth progressively and permanently lose their shape, because of the appearing clearances, so that the efficiency of the wiper blade is thus reduced.

The object of the invention is to provide a wiper blade for which the means for locking a vertebra in the mounted position in the support mount are rigid enough not to progressively lose their shape, and which make it possible to avoid any clearance between the various elements of the wiper blade, longitudinally as well as angularly.

For this purpose, the invention provides a wiper blade of the previously described type, wherein the means for locking the connecting element on the support mount, comprise, on the one hand longitudinal locking means for locking the structural element in position, and on the other hand angular means for locking a structural element in position in the connecting element.

Such characteristic more particularly enables the separation of the locking functions, for providing a locking of the structural element in the connecting element in every direction.

According to other characteristics of the invention:

the longitudinal locking means include at least one pin which is accommodated in a notch provided in the structural element;

the pins are at least 2 in number, each one being accommodated in a notch provided in the side edges on either side of the structural element;

each notch has a globally rectangular shape which matches the associated pin;

the angular locking means include holding teeth which cooperate with the side edges of the structural element;

the transversal free end of each holding tooth includes a stop surface which is pressed on the side edge of the structural element during the mounting and/or crimping of the connecting element on the support mount;

the pins and holding teeth are arranged on the side lugs of the connecting element;

each pin and each holding tooth transversely extends towards the inside of the connecting element from an internal vertical longitudinal face of the associated side lug;

with each pin and each holding tooth is associated at least one holding pad vertically positioned on either side of the pin and/or the holding tooth;

with each pin and each holding tooth is associated a pair of holding pads comprising an upper pad and a lower pad vertically positioned on either side of the pin and/or holding tooth;

the holding tooth is positioned transversally back with respect to each holding pad;

the side walls of the tubular body include first and second side openings which are gone through by the pin and the stop surface of the holding tooth of the connecting element, respectively;

the first and second side openings are provided by cutting the side wall prior to mounting the connecting element 16 on the support mount;

each side opening includes an upper cut and a lower cut, wherein the associated upper and lower holding pads are inserted;

each cut and the associated holding pad have matching shapes.

Other characteristics and advantages of the invention will appear upon reading the following detailed description for the understanding of which reference will be made to the appended drawings, in which:

FIG. 3 is a horizontal cross-sectional view of a wiper blade shown in FIG. 1 prior to the mounting of the connecting element;

FIG. 4 is a view similar to that of FIG. 2, wherein the connecting element is mounted on the support mount, showing the locking elements in operation.

For the description of the invention, the vertical, longitudinal and transversal orientations will be chosen in a non limitative way, according to a V, L, T system as mentioned in the Figures.

In the following description, identical, similar or analogous elements will be indicated by the same reference numbers.

Figure 1:
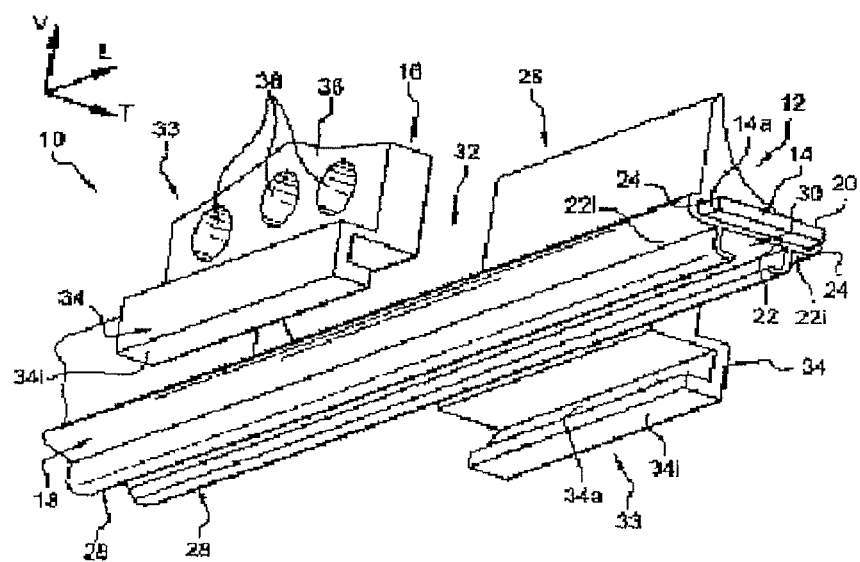
FIG. 1 is an exploded perspective view of a wiper blade of the generally known "flat blade" type, in which the locking means provided on the connecting element are not shown.

FIG. 1 shows a known general structure of a wiper blade 10 of the "flat blade" type, which includes the support mount 12 having a longitudinal main direction which carries the other components of the wiper blade 10, an internal vertebra 14 in the shape of a longitudinal horizontal blade, a connecting element 16 making it possible to connect the wiper blade 10 to a drive arm (not shown) and a wiping blade (not shown). The connecting element 16 comprises locking means for locking the vertebra 14 inside the mount 12 which are not shown in FIG. 1.

The mount 12 includes a tubular central body 18 having a longitudinal main axis which is delimited by a horizontal upper wall 20, a horizontal lower wall 22 and by two vertical and longitudinal side walls 24.

Of course, such delimitation of the tubular body 18 is not limitative. As a matter of fact, the tubular body may have a section of a circular or elliptical shape, insofar as the body is able to accommodate a vertebra 14, whatever its shape.

The mount 12 also comprises a longitudinal upper rib 26 which extends vertically upwards from the upper face of the horizontal upper wall 20 of the body 18, and which is aerodynamically shaped, so as to generate pressing forces of the wiper blade 10 on the glass surface, under the action of the wind produced by the movement of the vehicle.

Eventually, the support mount 12 comprises lower means for mounting the wiping blade, which consist in two opposing longitudinal lower hooks 28, which delimit a tubular body 30 opening downwards, wherein a backbone matching the wiping blade is mounted.

The vertebra 14 constitutes the structural element of the wiper blade 10 which stiffens the mount 12. The vertebra 14 is made of a rather rigid material for example steel or a composite material and it consists of a longitudinal horizontal blade which is arranged inside the tubular body 18.

The connecting element 16 is mounted longitudinally, approximately in the middle of the mount 12, and overlaps the body 18 of the mount 12, i.e. which means it extends above the horizontal upper wall 20 and on either side of the side walls 24.

The upper rib 26 includes an opening 32 through which the connecting element 16 is mounted on the mount 12.

The connecting element 16 is composed of two identical parts 33 which are mounted in an arrangement wherein they are positioned opposite each other on the body 18, according to a transversal motion.

Each part 33 of the connecting element 16 includes an upper base 36 which rests on the upper face of the horizontal upper wall 20 of the body 18 and which includes means 38 for fixing the upper base 36 of the outer part 33 of the connecting element 16.

The fixing means 38 more particularly include a bore and a stem for each part 33 of the connecting element 16.

The connecting element 16 also includes two lower side lugs 34, each one extending downwards from an upper base 36 of the associated part 33 and being transversally distributed on either side of the body 18 of the mount 12, so as to provide the transversal positioning of the connecting element 16 with respect to the body 18.

The lower free end 34i of each side lug 34 is bent towards the inside of the connecting element 16 and constitutes a hook extending opposite a lower face 22i of the horizontal lower wall 22 of the body 18. The lower end 34i of each side lug 34 thus makes it possible to provide the vertical locking of the connecting element 16 in the position mounted around the body 18.

Figure 2:
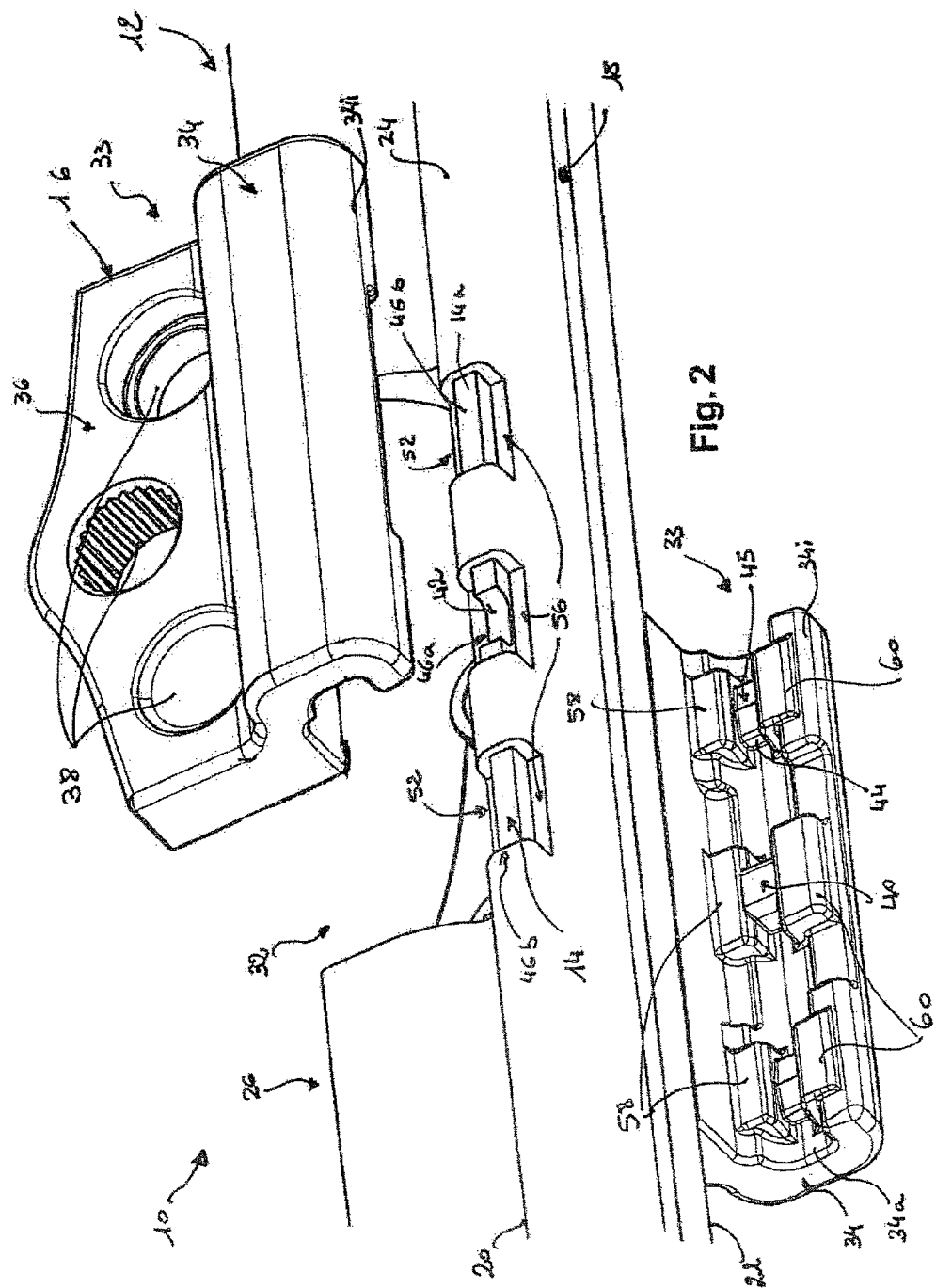
FIG. 2 is an exploded perspective schematic view of a wiper blade including a connecting element complying with the invention.

As can been seen in FIG. 2, the connecting element 16 comprises locking means for locking the vertebra 14 in the mounted position inside the hollow body 18 of the support mount 12.

The locking means of the connecting element 16 are of two types:
longitudinal locking means and
angular locking means.

The combination of the two types of locking means makes it possible to hold the vertebra 14 in position in the body 18 in all the directions.

Longitudinal locking means include at least an internal transversal pin 40 positioned on each part 33 of the connecting element 16. Such pin 40 cooperates with a notch 42 provided in the vertebra 14 for providing the longitudinal locking of the vertebra 14 in the position mounted in the body 18 of the mount.

The pins 40 are provided on the side lugs 34.

The notches 42, which accommodate the pins 40, are provided in the side edges 14a of the vertebra 14 and according to an embodiment of the invention, the notches 42 have a shape matching that of the pins 40, for example a rectangular shape.

In this case, each side lug 34 includes a pin 40 and each side edge 14a of the vertebra 14 thus includes a notch 42.

Each pin 40 transversally extends towards the inside of the connecting element 16 from an internal vertical longitudinal face 34a of the associated side lug 34 and its internal free end is accommodated in the associated notch 42 of the vertebra 14.

The pins 40 allow an easy positioning of the connecting element 16 on the mount and their cooperation with the notches 42 provides a good longitudinal mechanical holding of the vertebra 14 in the connecting element 16.

The angular locking means include internal transversal holding teeth 44 positioned on each part 33 of the connecting element 16 which cooperates with the side edges 14a of the vertebra 14. Each holding tube 44 includes a stop surface 45 which is intended to contact a side edge of the vertebra during the mounting.

In this case, each side lug 34 includes two teeth 44 positioned on either side of the pin 40 and each side edge 14a over the vertebra 14 thus includes two contact areas.

Each tooth 44 transversely extends towards the inside of the connecting elements 16 from the internal vertical longitudinal face 34a of the associated side lug 34 and its stop surface 45 is pressed on the side edge 14a of the vertebra during the mounting and/or the crimping of the element 16 on the mount 12.

The pressing of the teeth 44 on the sides of the vertebra makes it possible to obtain a good holding in torsion in the case of an angular motion between the mount 12 and the connecting element 16, as well as vertical holding of the vertebra in the mount.

Such separation of the holding functions according to the various directions makes it possible to adapt the locking means to the desired holding direction and improves the quality and the performances of the connection between the connecting element 16 and the mount 12.

In such an arrangement, the centre of the notch 42 is the reference for providing the notch 42 and for assembling the wiper blade. Such arrangement with a pair of pins 40 cooperating with a pair of notches 42 then does not require any tolerance or particular clearance for the manufacturing and assembling of the connecting element 16 and the mount 12.

In addition, for providing the holding of the body 18 with respect to the connecting element 16, each pin 40 and tooth 44 is designed to be associated with at least one holding pad and preferably a pair of holding pads 58, 60, each pad being vertically positioned on either side of the pin or the tooth of the internal face 34a of the associated side lug 34.

Such pads 58, 60 having a globally rectangular shape make it possible to help positioning the connecting element 16 on the mount 12 and holding the body 18 with respect to the connecting element 16 through their cooperation with the side edge 14a of the vertebra 14.

Thus, the upper 58 and lower 60 holding pads associated with a pin 40 and/or a holding tooth 44 are vertically arranged on either side of the vertebra 14, thus providing the vertical and longitudinal positioning of the vertebra 14 with respect to the connecting element 16.

In FIGS. 3 and 4 is shown, in cross-section, the connecting element 16 before and after the mounting on the mount 12.

Prior to the mounting, the two parts 33 of the connecting element 16 are positioned on either side of, and opposite lateral edges 14a of the vertebra 14, so that the pins 40 match the notches 42.

The teeth 44, provided with their stop surfaces 45 are positioned on either side of each pin 40, opposite the side edges of the vertebra 14.

After mounting of the element 16 on the mount 12 and fixing both parts 33, for example by crimping or using locking means 38, the pins 40 are accommodated in the notches 42 and the top surfaces 45 of the teeth 44 are pressed against the side edges 40a of the vertebra 14.

Besides, as can be seen more particularly in FIGS. 2 and 3, the side walls 24 of the body 18 include first 46a and second 46b side openings intended to cooperate with the pins 40 and teeth 44 positioned on the connecting elements 16.

Such side openings give a direct access to the vertebra 14 and to the side edges 14a thereof holding it or resting against it.

Each first side opening 46a is positioned opposite each notch 42 and gone through by the associated pin 40 of the connecting element 16.

The pin 40 is thus accommodated at the bottom of the associated notch 42, thus improving the longitudinal locking of the vertebra 14 with respect to the connecting element 16.

The second slide openings 46b are positioned on either side of a first side opening 46a and gone through by the stop surface 45 of the associated holding tooth 44.

The tooth 44 is thus positioned at the level of the side opening 46b and the stop surface 45 is pressed against the side edge 14a of the vertebra 14.

Such side openings thus give a direct access to the vertebra 14 and its side edges 14a for holding it or resting against it.

The first and second side openings 46a and 46b are made prior to mounting the connecting element 16 on the mount 12 during the manufacturing of the mount 12 by moulding or co-extruding or by cutting operations.

As can be seen in FIG. 2, the side openings 46a and 46b comprise in addition an upper cut 52 provided in the upper horizontal wall 20 which transversely extends towards the inside of the mount 12 and a lower cut 56 provided in the horizontal lower wall 22 and which also transversely extends towards the inside of the mount 12.

In practice, each pair of cuts constituted by an upper cut 52 and a lower cut 56 composes a single opening with the first and second side openings 46a, 46b.

The upper 58 (not visible in FIGS. 3 and 4 because of the cross-sectional view) and lower 60 holding pads match the upper 52 and lower 56 cuts respectively, which gives a horizontal positioning without any clearance of the support mount 12 with respect to the connecting element 16.

In this case, as can be seen in FIG. 2, the upper cut 52 and the matching upper pad 58 have a globally rectangular shape.

In addition, the teeth 44 transversely extend back from the upper 58 and lower 60 pads.

The side edge 14a of the vertebra is thus accommodated between the upper 58 and lower 60 pads, thus providing the vertical positioning of the vertebra 14 inside the body 18, more particularly in order to hold the vertebra 14 in horizontal position.

Such separation of the longitudinal and angular holding functions makes it possible to provide simplified cuts at the level of the vertebra 14 and side opening 46a and 46b as well as an easy positioning of the parts during the assembling of the wiper blade.

The invention claimed is:

1. A motor vehicle wiper blade, comprising:
   a support mount extending in a longitudinal main direction, the support mount comprising means for supporting a wiping blade and a tubular body having a longitudinal main axis;
   a structural element in a form of a longitudinal horizontal strip which is accommodated inside the tubular body; and
   a connecting element for connecting the blade to a drive arm which is mounted on the support mount and which comprises locking means for locking the structural element in a position in the connecting element,
   wherein the locking means of the connecting element comprises:
      longitudinal means for locking the structural element in said position; and
      angular means for locking the structural element in said position,
   wherein the structural element comprises a first side edge,
   wherein a first notch is positioned along the first side edge of the structural element,
   wherein the first notch accommodates the longitudinal locking means for longitudinally locking the structural element with respect to the connecting element, and wherein at a location along the first side edge where the first notch is not positioned, the first side edge of the structural element cooperates with the angular locking means for angularly locking the structural element with respect to the connecting element.

2. The wiper blade according to claim 1,
wherein the longitudinal locking means comprises a pin, and
wherein the first notch accommodates the pin of the longitudinal locking means for longitudinally locking the structural element with respect to the connecting element.

3. The wiper blade according to claim 2,
wherein the angular locking means comprises a plurality of holding teeth, and
wherein at a location along the first side edge where the first notch is not positioned, the first side edge of the structural element cooperates with the plurality of holding teeth of the angular locking means for angularly locking the structural element with respect to the connecting element.

4. The wiper blade according to claim 1,
wherein the structural element further comprises a second side edge,
wherein a second notch is positioned along the second side edge of the structural element,
wherein the longitudinal locking means comprises a first pin and a second pin,
wherein the first notch accommodates the first pin of the longitudinal locking means for longitudinally locking the structural element with respect to the connecting element, and
wherein the second notch accommodates the second pin of the longitudinal locking means for longitudinally locking the structural element with respect to the connecting element.

5. The wiper blade according to claim 4,
wherein the structural element further comprises a second side edge,
wherein a second notch is positioned along the second side edge of the structural element,
wherein the angular locking means comprises a first plurality of holding teeth and a second plurality of holding teeth,
wherein at a location along the first side edge where the first notch is not positioned, the first side edge of the structural element cooperates with the first plurality of holding teeth of the angular locking means for angularly locking the structural element with respect to the connecting element, and
wherein at a location along the second side edge whether the second notch is not positioned, the second side edge of the structural element cooperates with the second plurality of holding teeth of the angular locking means for angularly locking the structural element with respect to the connecting element.

6. The wiper blade according to claim 1,
wherein the angular locking means comprises a plurality of holding teeth, and
wherein at a location along the first side edge where the first notch is not positioned, the first side edge of the structural element cooperates with the plurality of holding teeth of the angular locking means for angularly locking the structural element with respect to the connecting element.

7. The wiper blade according to claim 1,
wherein the structural element further comprises a second side edge,
wherein a second notch is positioned along the second side edge of the structural element,
wherein the angular locking means comprises a first plurality of holding teeth and a second plurality of holding teeth,
wherein at a location along the first side edge where the first notch is not positioned, the first side edge of the structural element cooperates with the first plurality of holding teeth of the angular locking means for angularly locking the structural element with respect to the connecting element, and
wherein at a location along the second side edge whether the second notch is not positioned, the second side edge of the structural element cooperates with the second plurality of holding teeth of the angular locking means for angularly locking the structural element with respect to the connecting element.

8. A motor vehicle wiper blade, comprising:
a support mount extending in a longitudinal main direction, the support mount comprising means for supporting a wiping blade and a tubular body having a longitudinal main axis;
a structural element in a form of a longitudinal horizontal strip which is accommodated inside the tubular body; and
a connecting element for connecting the blade to a drive arm which is mounted on the support mount and which comprises locking means for locking the structural element in a position in the connecting element,
wherein the locking means of the connecting element comprises:
longitudinal means for locking the structural element in said position; and
first and second angular means for locking the structural element in said position, wherein the longitudinal locking means is positioned between the first angular locking means and the second angular locking means along a longitudinal direction of the connecting element
wherein the longitudinal locking means comprises a pin, and the in is associated with an upper pin holding pad and a lower pin holding pad, and the upper pin holding pad and the lower pin holding pad are positioned on either side of the pin.

9. The wiper blade according to claim 8, wherein the pin is accommodated in a notch for longitudinally locking the structural element with respect to the connecting element.

10. The wiper blade according to claim 8,
wherein the first angular locking means comprises a first plurality of holding teeth,
wherein the second angular locking means comprises a second plurality of holding teeth, and
wherein the first plurality of holding teeth and the second plurality of holding teeth cooperate with a single side edge of the structural element for angularly locking the structural element with respect to the connecting element.

11. The wiper blade according to claim 9,
wherein the first angular locking means comprises a first plurality of holding teeth,
wherein the second angular locking means comprises a second plurality of holding teeth, and
wherein the first plurality of holding teeth and the second plurality of holding teeth cooperate with a single side edge of the structural element for angularly locking the structural element with respect to the connecting element.

12. The wiper blade according to claim 11, wherein the connecting element further comprises a side lug having an internal face,
wherein the pin, the first plurality of holding teeth, and the second plurality of holding teeth are positioned on the internal face of the side lug.

13. The wiper blade according to claim 12, wherein the first plurality of holding teeth is associated with an upper first holding pad and a lower first holding pad,
wherein the upper first holding pad and the lower first holding pad are vertically positioned on either side of the first plurality of holding teeth on the internal face of the side lug,
wherein the second plurality of holding teeth is associated with an upper second holding pad and a lower second holding pad, and
wherein the upper second holding pad and the lower second holding pad are vertically positioned on either side of the second plurality of holding teeth on the internal face of the side lug.

14. A motor vehicle wiper blade comprising:
a support mount extending in a longitudinal main direction, the support mount comprising means for supporting a wiping blade and a tubular body having a longitudinal main axis;
a structural element in a form of a longitudinal horizontal strip which is accommodated inside the tubular body; and
a connecting element for connecting the blade to a drive arm which is mounted on the support mount and which comprises locking means for locking the structural element in a position in the connecting element,
wherein the locking means of the connecting element comprises:
longitudinal means for locking the structural element in said position; and
angular means for locking the structural element in said position,
wherein a transversal length of the longitudinal locking means is longer than a transversal length of the angular locking means,
wherein the longitudinal locking means comprises a pin that is accommodated in a notch of the structural element for longitudinally locking the structural element with respect to the connecting element, and
wherein the pin is associated with an upper pin holding pad and a lower pin holding pad, and wherein the upper pin holding pad and the lower pin holding pad are positioned on either side of the pin.

15. The wiper blade according to claim 14, wherein the angular locking means comprises a plurality of holding teeth that cooperate with a side edge of the structural element for angularly locking the structural element with respect to the connecting element.

16. The wiper blade according to claim 14,
wherein the connecting element further comprises a side lug having an internal face, wherein the pin and the plurality of holding teeth are positioned on the internal face of the side lug.

17. The wiper blade according to claim 16,
wherein the plurality of holding teeth is associated with an upper teeth holding pad and a lower teeth holding pad,
wherein the upper teeth holding pad and the lower teeth holding pad are vertically positioned on either side of the plurality of holding teeth on the internal face of the side lug.

* * * * *